United States Patent [19]
Stephan

[11] Patent Number: 5,831,520
[45] Date of Patent: Nov. 3, 1998

[54] ANTI-LOCKOUT SMART KEY SYSTEM

[75] Inventor: Craig Hammann Stephan, Ann Arbor, Mich.

[73] Assignee: Ford Motor Company, Dearborn, Mich.

[21] Appl. No.: 6,624

[22] Filed: Jan. 14, 1998

[51] Int. Cl.⁶ .................................................. B60Q 1/00
[52] U.S. Cl. ....................... 340/457; 340/426; 340/539; 340/825.31; 307/10.1; 307/10.3
[58] Field of Search ................... 340/457, 457.1, 340/426, 539, 542, 541, 825.31, 568; 307/9.1, 10.1, 10.3, 10.4, 10.5

[56] References Cited

U.S. PATENT DOCUMENTS

| | | | |
|---|---|---|---|
| 4,670,746 | 6/1987 | Tamiguchi et al. | 340/825.31 |
| 4,672,375 | 6/1987 | Mochida et al. | 340/825.31 |
| 5,438,312 | 8/1995 | Lewis | 340/457 |
| 5,451,928 | 9/1995 | Cody | 340/457 |
| 5,504,377 | 4/1996 | Nowell | 307/10.1 |
| 5,600,302 | 2/1997 | Lewis | 340/457 |
| 5,659,291 | 8/1997 | Kennedy et al. | 340/457 |
| 5,679,984 | 10/1997 | Talbot et al. | 307/10.3 |

*Primary Examiner*—Brent Swarthout
*Assistant Examiner*—Van T. Trieu
*Attorney, Agent, or Firm*—Roger L. May; Mark L. Mollon

[57] ABSTRACT

An apparatus and method for alerting a driver that the keys have been left inside the vehicle with the doors locked uses a smart key. The smart key (10) has a built-in transmitter and receiver (12), a battery (11) and a mechanical switch (14) for deactivating the transmitter/receiver to conserve key battery power. The apparatus and method cover the four different situations that can exist after the vehicle doors are closed and locked. First the driver is inside the vehicle. Second, the driver is outside the vehicle and has the key. Third, the driver has left the key behind in the ignition (16). Fourth, the driver has left the key behind somewhere in the vehicle other than the ignition. Situations three and four merit alerting the driver, and the system activates an alarm (24) to notify the driver and temporarily unlock the doors.

20 Claims, 3 Drawing Sheets

5,831,520

ANTI-LOCKOUT SMART KEY SYSTEM

FIELD OF THE INVENTION

The present invention relates to a system for preventing keys from inadvertently being locked in a vehicle.

BACKGROUND OF THE INVENTION

Locking keys inside a vehicle is an all too common experience for many drivers. There are a variety of systems to address the problem of preventing keys from inadvertently being left in a locked vehicle. One of the simpler systems is the key-in-ignition buzzer which works when the key has been left in the ignition, but not when the key is left anywhere else in the vehicle, such as on the seat, for instance. Of course, the key-in-ignition system only works if the driver hears the buzzer and reacts before closing the door. Another system uses a push-button coded entry which requires the driver to remember the code but does not inform the driver that the keys have been left behind in the vehicle.

A more complicated system uses a transmitter/receiver system on a fob that is not a key, and only acts to validate that the driver has the fob when the driver pushes exterior buttons on the door. The fob contains the transmitter/receiver and is separate from the key. This system works on the principle that the driver will move far enough from the vehicle in a given period of time that the signal will be below a threshold value. If the driver does not move away quickly enough an alarm will sound. If the driver leaves too quickly he may not hear the alarm. The transmitter continuously transmits during this period of time draining battery power from the small battery in the fob which is undesirable.

Another system uses a transmitter key which causes an alarm if the seat belt is unbuckled and the doors are then closed. The driver must unlock the door with the transmitter, not manually, to get the system to function. The driver must put the key in the ignition lock and/or buckle the seat belt before closing the door. Before closing the door, the driver must lock it using the transmitter, not the manual lock, to avoid an alarm and to avoid discharging the transmitter battery. Once the unlock button has been pressed, the transmitter continues to transmit until the lock button has been pressed or the key has been put in the ignition.

Although all the systems seem to work to some degree, they have relatively high energy consumption and require deliberate action by the driver to shut the transmitter down to avoid completely discharging the battery. Accordingly, it is desirable to have a system for preventing keys from being inadvertently locked in the vehicle that does not require conscious driver effort to operate and which minimizes battery drain.

SUMMARY OF THE INVENTION

The present invention is directed to overcoming one or more of the problems set forth above. Briefly summarized, according to one aspect of the present invention, an anti-lockout smart key system for a vehicle comprises a smart key having a built-in transmitter/receiver, a battery, and a mechanical switch. Insertion of the key into a lock opens the mechanical switch deactivating the transmitter/receiver. The system includes a door locking system having a door with a door lock for receiving the smart key and having means for generating door condition signals representing locked, unlocked, open and closed conditions of the door; an ignition locking system having an ignition lock for receiving the key and having means for generating ignition condition signals representing on, off, key inserted and key removed conditions of the ignition lock; a vehicle transmitter/receiver for communicating with the transmitter/receiver in the key; an alarm; and a controller receiving signals from the ignition locking system, door locking system and vehicle transmitter/receiver, the controller activating the alarm and temporarily unlocking the door when the key is left in the vehicle and the door is closed and locked.

According to another aspect of the present invention, a method for activating an alarm of a vehicle to alert a driver that a key has been left in the vehicle with all doors locked comprises the steps of: determining whether a last door has been closed; determining whether a last door has been locked; transmitting a signal from a vehicle transmitter/receiver when the last door is closed and locked; determining whether a key is inserted in an ignition lock, said key being a smart key having a built-in transmitter/receiver and a mechanical switch with the switch opening when inserted into the ignition lock to deactivate the key transmitter/receiver; activating an alarm when the key is in the ignition lock and all doors are locked; transmitting a coded signal from the key transmitter/receiver when all doors are locked and the key is not in the ignition lock; receiving the signal from the key transmitter/receiver through the vehicle transmitter/receiver; determining whether the received signal is greater than a predetermined threshold level; activating the alarm when the received signal is above the threshold level.

The apparatus and method cover the four different situations that can exist after the vehicle doors are closed and locked. First the driver is inside the vehicle. Second, the driver is outside the vehicle and has the key. Third, the driver has left the key behind in the ignition. Fourth, the driver has left the key behind somewhere in the vehicle other than the ignition. Situations three and four merit alerting the driver, and the present invention activates an alarm to notify the driver and temporarily unlock the door.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
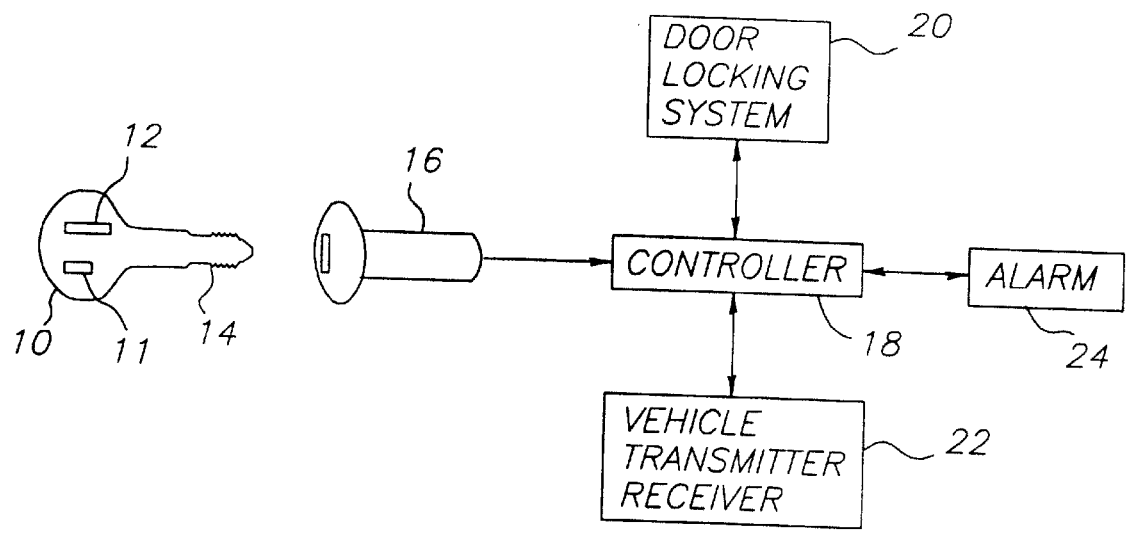
FIG. 1 is a block diagram of a vehicle ignition and door locking systems using a smart key according to the present invention.

Referring to FIG. 1, an anti-lockout smart key system for a vehicle uses a smart key 10 that has a built-in transmitter/receiver 12, a battery 11, and a mechanical switch 14, such as a push-button switch or magnetically operated reed switch, for example. The mechanical switch 14 opens when the key 10 is inserted into an ignition lock 16 or a door lock to deactivate the transmitter/receiver 12. Incorporating a charging port into the ignition lock allows the key battery to recharge while it is inserted in the lock, thereby extending key battery life indefinitely. Recharging allows a smaller battery or even a capacitor to be used to power the key.

Even with a rechargeable battery, it is desirable to conserve battery power in the key 10, so, when activated, the transmitter/receiver 12 operates in a standby mode where it receives for only a few milliseconds each second. The minimum on time is dictated by the turn-on time of the receiver, while the maximum standby time is fixed by the desire to have the key receive a turn-on signal from the vehicle before it is carried out of range by the driver, and also to notify the driver before he gets inconveniently distant from the vehicle. For lowest power consumption, it is desirable to make the ratio of the two as small as possible.

The ignition locking system has the ignition lock 16 which receives the key 10, and means for generating ignition condition signals representing on, off, key inserted and key removed conditions of the ignition lock. The ignition lock 16 communicates with a controller 18 which may be an electronic engine controller or other microprocessor based controller.

A door locking system 20 includes a door with a door lock for receiving the smart key and means for generating door condition signals representing locked, unlocked, open and closed conditions of the door as is known in the art.

A vehicle mounted transmitter/receiver 22 communicates with the transmitter/receiver 12 in the key 10. The key preferably transmits a coded signal while the vehicle mounted transmitter need not transmit a coded signal. An alarm system 24 provides an audible signal to alert the driver that the key has been left in the vehicle with the doors closed and locked. The controller 18 receives signals from the ignition locking system, door locking system and vehicle transmitter/receiver, and activates the alarm and temporarily unlocks the door when key is left in the vehicle and the door is closed and locked so the key can be retrieved.

Figure 2:
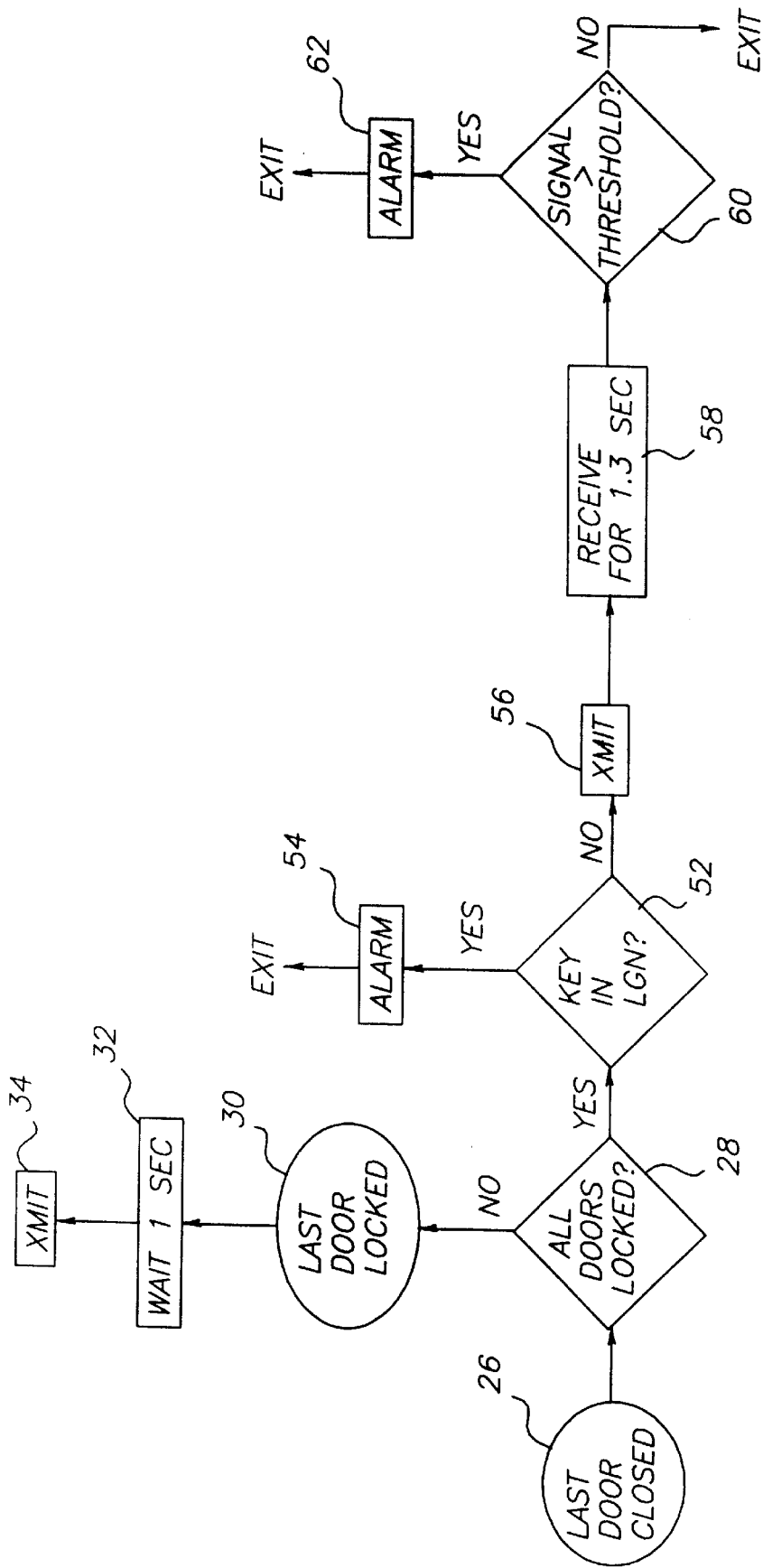
FIG. 2 is a flow chart for the ignition and door locking systems of FIG. 1.

Operation of the present invention is explained with reference to FIGS. 2–4. FIG. 2 is the vehicle flow diagram where the controller first determines whether the last door is closed at block 26. When the controller receives the last door closed signal, indicating that all doors on the vehicle have been closed, it immediately checks to see if all doors are locked at block 28. If so, it means that the doors were locked before closing. If not, it means that locking will be done externally, and the driver therefore has the key. When locking is to be done externally, then at block 30, the processor waits for the locking to happen, waits one second or so at block 32 to allow a driver manually locking the door time to remove the key from the door lock which activates the key, then at block 34 transmits an uncoded signal from the vehicle transmitter. The length of this signal is preferably 1.1 seconds. While the length of this signal and other signals herein are important relative to one another, the absolute values mentioned herein are strictly exemplative and can be varied as design parameters indicate.

Figure 3:
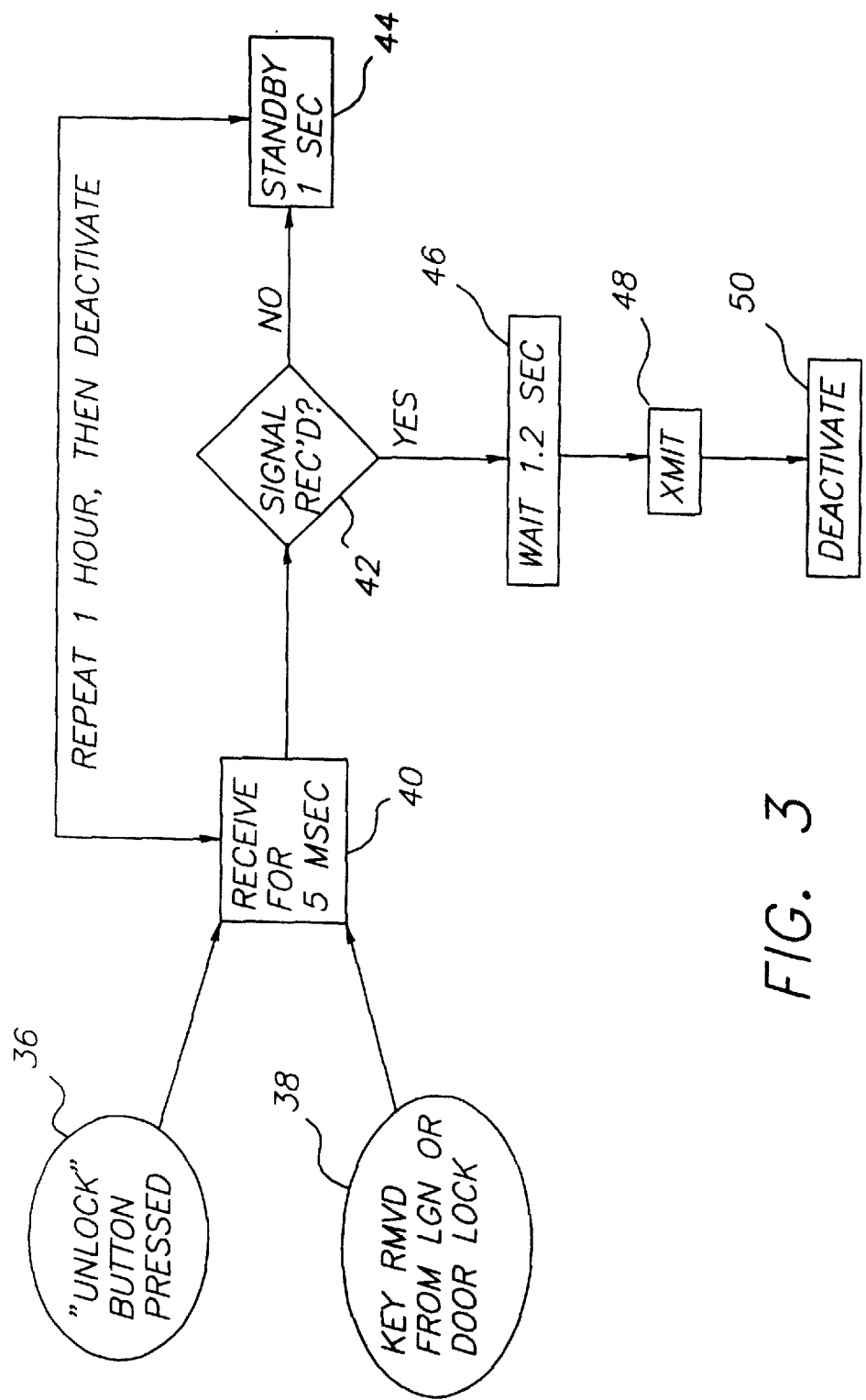
FIG. 3 is a flow chart for the smart key of FIG. 1 showing the transmit and receive cycles.

FIG. 3 illustrates the key response to the uncoded signal. Blocks 36 and 38 set up the events, namely, the unlock button is depressed or the key is removed from either the door or ignition lock. At block 40 the key receiver is activated and listens for the vehicle transmitter signal by receiving for a brief period of time, such as 5 milliseconds. If the transmitted signal is not received at block 42 during the 5 ms interval, then at block 44 the key receiver goes into a standby mode for 1 second. The key receiver repeats the receive and standby sequence for up to one hour, then deactivates to conserve battery power. If the 1.1 second uncoded signal is received at block 42, then the key responds at block 46 by waiting 1.2 seconds before sending back a coded signal at block 48 and deactivating at block 50.

Again referring to FIG. 2, if all doors are locked at block 28, then there is a possibility the driver has left the key in the vehicle. The processor checks at block 52 to see if the key is in the ignition. If so, an alarm is set at block 54. The alarm may flash the headlights, sound the horn momentarily, or provide some other signal to the driver that the key is still in the car. The processor also unlocks one or more doors temporarily, for a minute or so, to allow the driver the opportunity to retrieve the key.

If the key is not in the ignition at block 52, either the driver has the key with him or has left it inside the vehicle. To determine which is correct, at block 56 the vehicle transmitter immediately sends a 1.1 second uncoded signal, then receives for 1.3 seconds at block 58. If the key has been left behind, it will receive the signal. As mentioned before at blocks 42–50, receiving the signal causes the key transmitter to wait 1.2 seconds before sending back a coded signal and deactivating. The 1.2 second wait ensures that no matter what 5 ms interval of the vehicle's signal the key has received, the vehicle will be through transmitting and will be listening for a signal when the key transmits back. If the vehicle system is capable of simultaneously transmitting and receiving at two different frequencies, then a wait interval is not necessary.

Upon receipt of the key's signal, the processor compares its strength to a threshold value at block 60. This threshold value could be determined at manufacture, or it could be updated on a regular basis to compensate for battery drain or other changing factors. The updating could be accomplished by receiving the signal when the key is in a known location. One method would be to have the key transmit a signal whenever it is inserted into a lock, (i.e., when the mechanical switch is opened) just before deactivating. If the key-in-ignition sensor indicates that the key is in the ignition lock, and thus in a known, fixed location, the strength of the received signal could be used to adjust the threshold. If the signal strength is above the threshold, it indicates the key has been left behind in the car, and the processor triggers the alarm at block 62. If the driver has the key with him outside the car, signals between the key and vehicle will be attenuated by the metal structure of the vehicle, and the return signal strength will be below the threshold value. If the vehicle's signal strength is so attenuated that the key never receives it, the one hour deactivation time of the key ensures that it will not stay in standby mode indefinitely.

Figure 4:
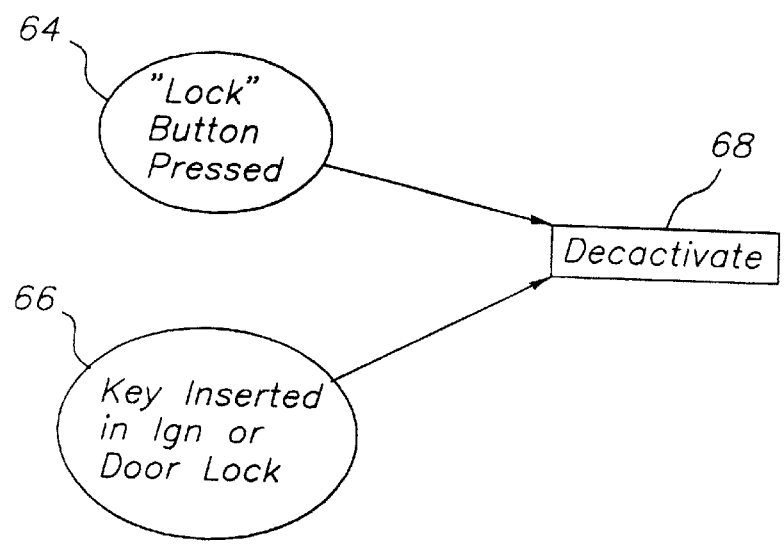
FIG. 4 is a flow chart for the smart key of FIG. 1 showing deactivation under certain conditions.

Referring to FIG. 4, whenever the lock button is depressed locking the doors at block 64 or the key is inserted in the ignition or door lock at block 66, then the alarm is deactivated at block 68. Alternatively, it may be desirable to have depressing the lock button active rather than deactivate the key. This would guard against the scenario where the driver locks the doors while they are still open by pushing the key button (which in the original configuration would deactivate the key), then leaves the key in the car and shuts the doors.

It can now be appreciated that an anti-lockout smart key system has been presented. The system uses a smart key along with vehicle mounted instrumentation to cause the vehicle to signal the driver and unlock the doors temporarily if the driver has left the key anywhere inside the vehicle when he closes the last locked door. The battery powered key is activated only for extremely short time intervals to minimize battery drain. No actions by the driver are required to activate or deactivate the system. The electronic circuitry on the key is simple, i.e., contains no microprocessors, to reduce power drain. The smart key contains a built-in transmitter/receiver. The transmitter is of the usual remote door lock/unlock type which transmits a security coded signal when activated by pressing a button, and in this case, when it receives a signal transmitted by the vehicle. The key contains a mechanical push-button switch that is opened when the key is inserted into the ignition or door lock. Opening the switch deactivates the key. The transmitter/receiver must be directly connected to the key and not on a separate fob to be activated in this fashion. Of course, if desired, the key could be made so that it could be detached from the head, such that it could still function as an ordinary (dumb) key. Closing the switch by removing the key from the ignition lock causes the key to activate its receiver for a few milliseconds out of every one-second period listening for a signal from the vehicle. Unlike the signal transmitted by the key, the signal transmitted by the vehicle need not be coded as there are no apparent security implications. As a result, the receiver in the key need only detect the presence of rf power at the transmitted frequency and can therefore be quite simple.

Vehicle equipment consists of a transmitter/receiver, similar to the door lock/unlock receiver, except that antenna placement for it is such as to make it sensitive only to signals originating from inside the vehicle. The antenna may be located beneath the driver or front passenger seat, for example, where the line-of-sight transmission to a key outside the vehicle is blocked by the vehicle's sheet metal. The signal transmitted by the vehicle need not be coded. The system makes use of sensors already in place on vehicles, namely, indicators that all doors have been closed, that all doors are locked, and that the key is in the ignition lock. The electronic engine controller or other processor correlates the various sensor and key signal inputs.

The logic sequence followed by the key/vehicle system is basically that the system is temporarily activated whenever the key is withdrawn from the ignition lock, from a door lock, or after pressing the unlock button. The latter feature is to cover a situation where the driver unlocks the vehicle, lays the key down in the vehicle, while seating a child for instance, then locks and closes the doors without ever putting the key in the ignition. If the driver leaves the key in the car and locks all doors after the system is thus activated, or at any time with the key in the ignition lock, the driver is signaled. If the driver takes the key with him, the system is automatically deactivated. Under no circumstances can the key battery be drained by being left on indefinitely. The system will still function if the driver uses an ordinary dumb key and leaves it in the ignition, but not, of course, if he leaves it on the seat.

It can also be appreciated that the apparatus and method cover the four different situations that can exist after the vehicle doors are closed and locked: (1) the driver is inside the vehicle, (2) the driver is outside the vehicle and has the key, (3) the driver has left the key behind in the ignition, and (4) the driver has left the key behind somewhere in the vehicle other than the ignition. Situations three and four merit alerting the driver, and the present invention activates an alarm to notify the driver and temporarily unlock the door.

As is evident from the foregoing description, certain aspects of the invention are not limited to the particular details of the examples illustrated. For example, a variation of the invention is to reverse the process for detecting the location of the key, continuing to use radio transmission in both directions. In this instance, the already existing outside antenna used for the door lock signal would listen for the signal from the key triggered by the doors being locked. The vehicle-key dialogue would be thus: The vehicle transmits a signal from the outside antenna when the doors are closed and locked. The key receives the signal and optionally compares it to a threshold. If the signal is above the threshold, it transmits back. A signal received above a threshold by the outside antenna indicates the key is safely outside the car. No signal or a signal below the threshold indicates the key is still inside the vehicle. An advantage of this approach is that no new antennas need to be installed in the vehicle.

In another variation of the method, the vehicle would transmit sound waves instead of radio frequency waves to the key. The principle is exactly the same as with radio frequency waves with the vehicle body absorbing sound rather than blocking radio wave transmission. An advantage of this approach is that it is easily accomplished by transmitting a short beep using existing vehicle audio systems and speakers. On most new vehicles, the four speakers are already in the vehicle, placed to provide reasonably uniform sound coverage through the whole interior of the vehicle. A high frequency sound wave, on the order of 15 to 20 kHz, would work best because it is easily absorbed and would be entirely unnoticeable to passengers. The return link from key to vehicle would continue to use the existing radio transmitter in the key. The vehicle-key dialogue would be thus: The vehicle transmits a high frequency beep when the doors are closed and locked. The microphone and tuned circuit in the key pick up sound and compare it to a threshold. If the sound intensity exceeds the threshold, the key transmits back signaling that it is still inside the vehicle. Experiments using sound waves revealed that the ratio of sound intensities for a microphone on the front seat to one a foot away from the vehicle with the doors closed was about 100:1.

In another variation of the method, the vehicle would transmit a "chirped" sound wave signal, in which the frequency is quickly swept from, for example, 10 to 20 kHz. Within the closed interior of the vehicle cabin, this would set up a changing pattern of acoustic standing waves. A key located within the cabin would receive an amplitude-modulated signal as a series of nodes and antinodes swept by it. In the open environment outside the vehicle, such standing waves would not be generated, and the key would receive an unmodulated signal. Thus, determination of the key location could be made on the basis of the degree of modulation of the received signal, rather than its strength.

While the invention has been described with reference to the preferred embodiments, it will be understood by those skilled in the art that various changes may be made and equivalents may be substituted for elements of the preferred embodiment without departing from invention. For example, while a key has been described, a smart card or other similar device could also be used. In addition, many modifications may be made to adapt a particular situation and material to a teaching of the invention without departing from the essential teachings of the present invention. It is accordingly intended that the claims shall cover all such modifications and applications as do not depart from the true spirit and scope of the invention.

What is claimed is:

1. An anti-lockout system for a vehicle, said vehicle having doors and an ignition, said anti-lockout system comprising:

a smart key having a built-in transmitter/receiver, a battery and a mechanical switch, said switch opening when inserted into a lock to deactivate said transmitter/receiver;

means for generating door condition signals representing locked, unlocked, open and closed conditions of said doors;

means for generating ignition condition signals representing on, off, key inserted and key removed conditions of said ignition;

a vehicle transmitter/receiver for communicating with said transmitter/receiver in said key;

an alarm; and a controller receiving the ignition condition signals and door condition signals, and receiving signals from the vehicle transmitter/receiver and key transmitter/receiver, said controller activating said alarm and temporarily unlocking said doors when key is left in the vehicle and the doors are closed and locked.

2. An anti-lockout system, as set forth in claim 1, wherein said vehicle transmitter/receiver is powered to receive for 1.3 seconds.

3. An anti-lockout system, as set forth in claim 1, wherein said key transmitter/receiver is powered to receive only a few milliseconds each second until deactivated by receiving a signal from the vehicle transmitter/receiver.

4. An anti-lockout system, as set forth in claim 1, wherein said key transmitter/receiver is powered to receive for five milliseconds each second until deactivated by receiving a signal from the vehicle transmitter/receiver.

5. An anti-lockout smart key system, as set forth in claim 1, wherein said key transmitter/receiver is repeatedly powered to receive for five milliseconds and standby for one second until deactivated by receiving a signal from the vehicle transmitter/receiver.

6. An anti-lockout system for a vehicle, comprising:

a smart key having a built-in transmitter/receiver and a mechanical switch, said switch opening when inserted into a lock to deactivate said transmitter/receiver;

a door locking system having a door with a door lock for receiving said smart key and having means for generating door condition signals representing locked, unlocked, open and closed conditions of said door;

an ignition locking system having an ignition lock for receiving said key and having means for generating ignition condition signals representing on, off, key inserted and key removed conditions of said ignition lock;

a vehicle transmitter/receiver for communicating with said transmitter/receiver in said key;

an alarm; and a controller receiving signals from said ignition locking system, door locking system and vehicle transmitter/receiver, said controller activating said alarm and temporarily unlocking said door when key is left in the vehicle and the door is closed and locked.

7. An anti-lockout system, as set forth in claim 6, wherein said vehicle transmitter/receiver is powered to receive for 1.3 seconds.

8. An anti-lockout system, as set forth in claim 6, wherein said key transmitter/receiver is powered to receive only a few milliseconds each second until deactivated by receiving a signal from the vehicle transmitter/receiver.

9. An anti-lockout system, as set forth in claim 6, wherein said key transmitter/receiver is powered to receive for five milliseconds each second until deactivated by receiving a signal from the vehicle transmitter/receiver.

10. An anti-lockout smart key system, as set forth in claim 6, wherein said key transmitter/receiver is repeatedly powered to receive for five milliseconds and standby for one second until deactivated by receiving a signal from the vehicle transmitter/receiver.

11. A method for activating an alarm of a vehicle to alert a driver that a key has been left in the vehicle with doors locked, comprising the steps of:

determining whether a last door has been closed;

determining whether a last door has been locked;

transmitting a signal from a vehicle transmitter/receiver when the last door is closed and locked;

determining whether a smart key is inserted in an ignition lock, said smart key having a built-in transmitter/receiver, a battery and a mechanical switch, said switch closing when inserted into the ignition lock to deactivate said key transmitter/receiver;

activating an alarm when the key is in the ignition lock and all doors are locked;

transmitting a signal from the vehicle transmitter/receiver when all doors are locked and the key is not in the ignition lock;

receiving the signal from the vehicle transmitter/receiver through the key transmitter/receiver;

transmitting a signal from the key transmitter/receiver to the vehicle transmitter/receiver after receiving the signal from the vehicle transmitter/receiver;

receiving the signal transmitted from the key transmitter/receiver by the vehicle transmitter/receiver;

determining whether the signal received by the vehicle transmitter/receiver is greater than a predetermined threshold level;

activating the alarm when the signal received by the vehicle transmitter/receiver is above the threshold level.

12. A method, as set forth in claim 11, wherein the step of activating the alarm includes temporarily unlocking the door.

13. A method, as set forth in claim 11, wherein the step of receiving the signal from the vehicle transmitter/receiver through the key transmitter/receiver includes powering the key transmitter/receiver to receive for only a few milliseconds each second until deactivated by receiving the signal from the vehicle transmitter/receiver.

14. A method, as set forth in claim 11, wherein the step of receiving the signal from the vehicle transmitter/receiver through the key transmitter/receiver includes powering the key transmitter/receiver to receive for five milliseconds each second until deactivated by receiving the signal from the vehicle transmitter/receiver.

15. A method, as set forth in claim 11, wherein the step of receiving the signal from the vehicle transmitter/receiver through the key transmitter/receiver includes repeatedly powering the key transmitter/receiver to receive for five milliseconds and standby for one second until deactivated by receiving the signal from the vehicle transmitter/receiver.

16. A method, as set forth in claim 11, wherein the step of transmitting the signal from the vehicle transmitter/receiver includes generating sound waves and forming acoustical standing wwaves inside the vehicle.

17. A method, as set forth in claim 11, including the step of locating a vehicle antenna inside the vehicle where transmission between the vehicle transmitter/receiver and the key transmitter/receiver is attenuated by sheet metal of the vehicle when the key is outside the vehicle.

18. A method, as set forth in claim 11, including the step of locating a vehicle antenna outside the vehicle where transmission between the vehicle transmitter/receiver and the key transmitter/receiver is attenuated by sheet metal of the vehicle when the key is inside the vehicle.

19. A method, as set forth in claim 11, including the step of receiving an attenuated signal and concluding that the key is inside the vehicle.

20. A method, as set forth in claim 11, including the step of receiving a nonattenuated signal and concluding that the key is outside the vehicle.

* * * * *